(No Model.) 3 Sheets—Sheet 3.
E. G. LATTA.
VELOCIPEDE.
No. 325,944. Patented Sept. 8, 1885.
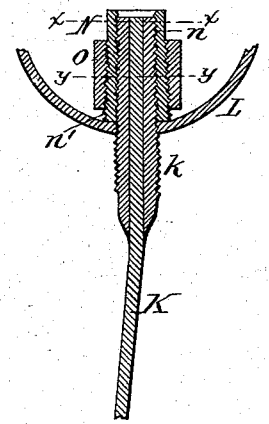
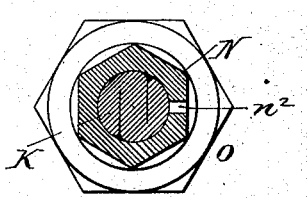
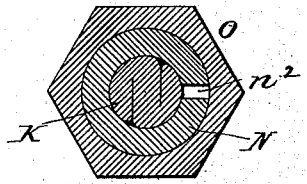
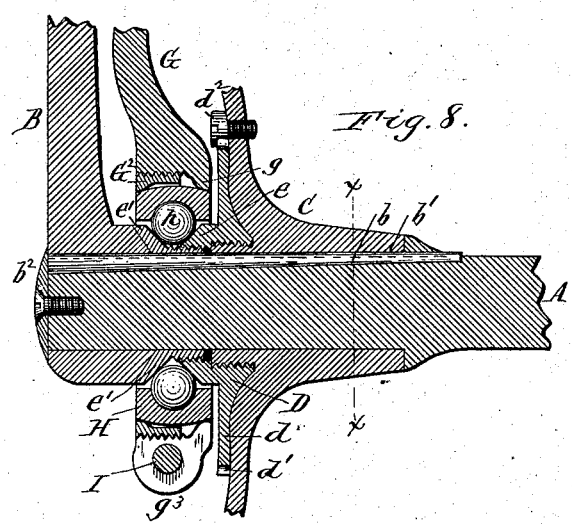
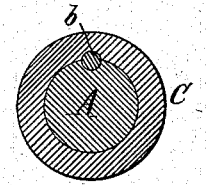
Witnesses:
Theo. L. Popp
Otto H. Kroh
E. G. Latta Inventor.
By Wilhelm Bonner
Attorneys.

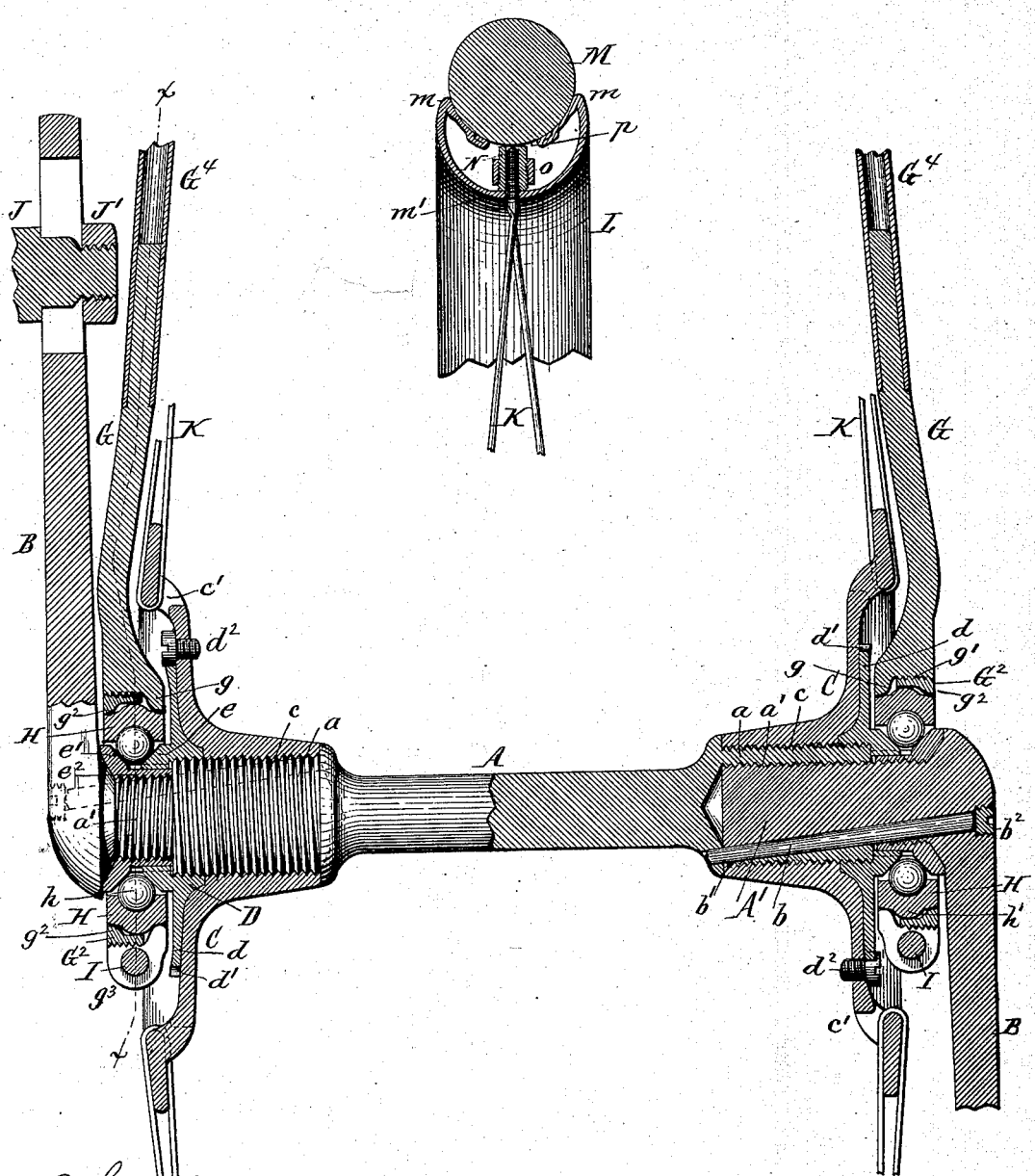

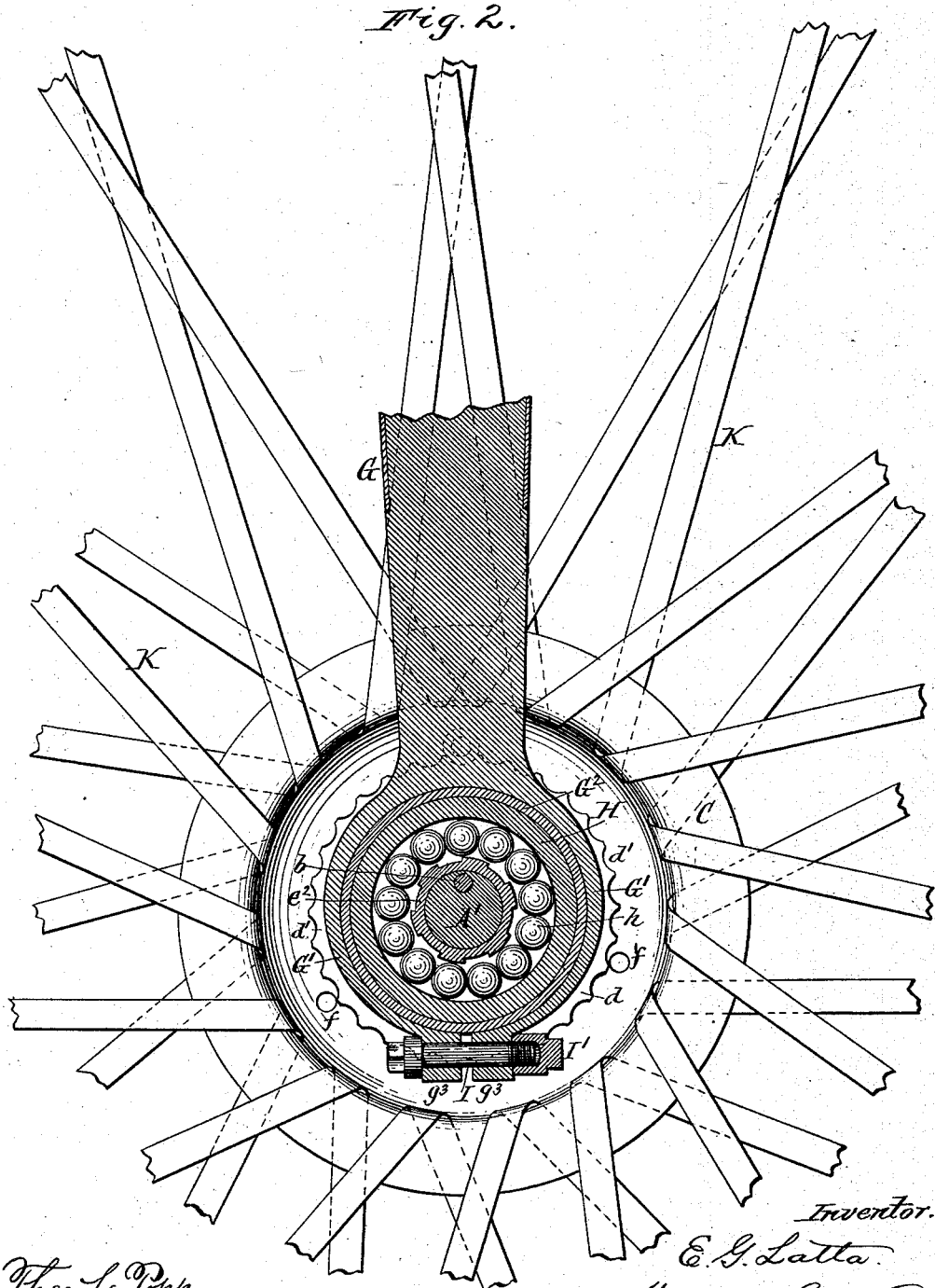

UNITED STATES PATENT OFFICE.

EMMIT G. LATTA, OF FRIENDSHIP, NEW YORK, ASSIGNOR TO THE POPE MANUFACTURING COMPANY, OF HARTFORD, CONNECTICUT.

VELOCIPEDE.

SPECIFICATION forming part of Letters Patent No. 325,944, dated September 8, 1885.

Application filed October 15, 1884. (No model.)

*To all whom it may concern:*

Be it known that I, EMMIT G. LATTA, of Friendship, in the county of Allegany and State of New York, have invented new and useful Improvements in Velocipedes, of which the following is a specification.

This invention relates to certain improvements in the driving-wheels of bicycles or velocipedes, and has for its object to improve the construction of the central part of the wheel, whereby the axle, cranks, bearings, and spokes are rendered more secure and compact and the parts strengthened without adding to their weight, and whereby the various parts can be readily taken apart and put together, and whereby the ball-bearings can be readily adjusted for wear and properly align themselves with the axle, and to provide a universal coupling between the bearings and the fork, whereby the machine will run freely at all times; also to improve the construction of the spokes and the rim of the wheel.

My invention consists to these ends of the improvements which will be hereinafter fully set forth, and pointed out in the claims.

In the accompanying drawings, consisting of three sheets, Figure 1 represents a transverse sectional elevation of the central portion and rim of the driving-wheel of a bicycle provided with my improvements. Fig. 2 is a vertical sectional elevation in line $x$ $x$, Fig. 1. Fig. 3 is an elevation of the outer end of one of the spokes before the same has been folded, on an enlarged scale. Fig. 4 is a similar view showing the outer end of the spoke folded ready to be turned and screw-threaded. Fig. 5 is a sectional elevation of the outer end of the spoke, showing the manner of securing the same to the rim of the wheel. Figs. 6 and 7 are horizontal sections in lines $x$ $x$ and $y$ $y$, Fig. 5, respectively. Fig. 8 is a transverse section of a modified construction of my improvements. Fig. 9 is a cross-section in line $x$ $x$, Fig. 8.

Like letters of reference indicate corresponding parts in the several figures.

A represents the central solid portion of the axle, which is provided with tubular ends $a$ $a$, and A' A' represent the outer or end portions of the axle, secured in the tubular portions $a$ $a$ by screw-threads $a'$ and keys $b$.

B B represent the cranks, which are formed in one piece with the outer portions, A', of the axle, whereby a strong smooth crank is produced, which is free from projecting keys or similar fastenings, and whereby a closer build is obtained than is possible when the cranks are secured to the axle outside of the bearing.

The keys $b$ are preferably made tapering, and are inserted from outside the cranks B in corresponding key-seats, $b'$, formed in the end portions, A', and which extend through the hub to permit the keys to be driven out from inside the wheel. The keys $b$ are held in place by a screw, $b^2$, which engages in the outer threaded end of the key-seat $b'$.

C C represent the hubs, secured to the tubular ends $a$ $a$ of the axle by screw-threads $c$, or, if desired, the hubs C may be secured to the tubular ends of the axle by brazing. The tubular ends $a$ $a$ of the axle project through the hubs C and serve to strengthen the outer ends of the axle as near to the cranks as possible.

D represents a collar provided with a screw-thread which engages over the outer threaded end of the tubular end $a$ of the axle. The collar D is provided with a flange or rim, $d$, which rests against the outer face of the hub. The outer edge of the rim $d$ is fluted or provided with a series of notches or semicircular depressions, $d'$, and the flange or rim of the hub C is provided with a screw, $d^2$, the head of which engages in one of the depressions $d'$, whereby the collar D is prevented from turning on the axle.

$e$ represents the inner cone-bearing, which is formed with the collar B, and $e'$ represents the outer cone-bearing, which is provided with an internal screw-thread, which engages with the screw-thread $a'$, formed on the end portion, A', of the axle. The bearing $e$ is made to surround or overlap a collar or sleeve, $e^2$, formed on the bearing $e'$, and the overlapping surface of the bearing $e$ is provided with a series of projections which engage in corresponding spaces formed on the outer surface of the sleeve $e^2$ of the bearing $e'$, whereby the outer bearing is prevented from turning except with the inner bearing, $e$. The screw-thread $c$, upon which the collar D engages, and the screw-thread $a'$, which engages with the outer bearing, turn in opposite directions, one being a right-hand thread and the other a left-hand thread, whereby both bearings are caused to approach or recede from each other when adjusted on their respective screw-threads.

To adjust the bearings the screw $d^2$ is loosened sufficiently to permit its head to free the depression $d'$ in the rim $d$, whereby the collar D can be turned on the screw-thread $c$ and the bearing $e$ adjusted. The overlapping portions of the bearings $e\ e'$ being engaged by the projections and corresponding spaces formed on their contiguous surfaces causes the outer bearing to be adjusted at the same time with the bearing $e$, whereby both bearings are adjusted simultaneously. When the bearings have been adjusted sufficiently, the screw $d^2$ is again tightened and made to engage in one of the notches $d'$, whereby the bearings are firmly held from further movement. The adjustment thus obtained is sufficient for all ordinary purposes; but if a further adjustment is desired the hub C may be provided with one or more screw-holes, $f$, arranged at unequal distances from each other on opposite sides of the depressions or notches $d'$, and the screw $d^2$ may be inserted in either screw-hole $f$, as desired, so that its head will engage in one of the notches $d'$.

G G represent the arms of the fork, which straddle the wheel and which terminate in semicircular jaws G' G'.

H represents the annular bearing-box, arranged between the jaws G' G', and $h$ represents a row of balls which are interposed between the bearing-box H and the cone-bearings $e\ e'$. The inner edge of the arms G' is provided with a bead or flange, $g$, of smaller diameter than the center outer surface of the box H, and the remaining inner surface of the arms G' is provided with an internal screw-thread, $g'$, over which engages an annular screw-nut, $G^2$, which is provided with a similar bead or flange, $g^2$, corresponding with the bead $g$.

The bearing-box H is provided on its outer surface with a rim or bead, $h'$, having a spherical or curved outer face, and is inserted between the jaws G' and confined therein by the screw-nut $G^2$. The bearing-box H is held in place between the beads or flanges $g\ g^2$, and the outer edges of the box, which rest upon the flanges $g\ g^2$, are made spherical to permit a slight universal movement of the bearing-box between the jaws G'. After the box H has been inserted between the jaws G' the screw-nut $G^2$ is inserted and turned sufficiently to hold it in place between the jaws, and the cone-bearings $e\ e'$ are then turned or adjusted to seat the balls within the box, which will cause the bearing-box H to turn slightly between the jaws G' to fit or align itself with the balls and cone-bearings $e\ e'$. The screw $G^2$ is then tightened until the box is clamped between the beads or flanges $g\ g^2$. The lower ends of the jaws G' terminate in lugs $g^3\ g^3$, which are provided with a screw-bolt, I, and nut I', whereby the ends of the jaws are secured together.

By tightening the nut I' on the bolt I the box H is firmly held in place and prevented from turning with the axle, and insures a free running bearing and a rigid and firm attachment. The space between the lugs $g^3\ g^3$ of the jaws G' may be made wide enough to permit the fork-arms to be inserted over the axle without springing the jaws G'; or, if desired, the jaws G' may be made solid at their lower ends and the bolt I dispensed with, especially when the bearings are designed to be used on tricycles.

This construction of the bearings permits both bearings to be adjusted on the axle without moving the bearing-box or fork, and permits the fork to be arranged close to the hub and the crank very close to the fork without leaving room for the fork to be moved either way, which is necessary when the bearings are adjusted by moving but one bearing toward or from the other.

As shown in Fig. 8, the outer bearing, $e'$, may be provided with an external screw-thread, which engages with an internal screw-thread formed on the overlapping portion of the cone $e$, whereby both bearings are adjusted by turning the collar D. The outer bearing may also be made to slide on the axle, as well as the hub-flanges and cranks, and the bearings, hubs, and cranks be held from turning on the axle by forming the key-seat $b'$ parallel with the axle and extending into the bore of the crank, bearings, and hub-flanges, and inserting the key $b$ therein, as shown in Figs. 8 and 9. The key may be inserted from inside the wheel, if desired.

$G^4$ represents the upper hollow portion of the fork-arms, which connect the arms G above the rim of the wheel with the steering-head. The fork-arms are curved or bent inwardly near their lower ends from a point above the axle or bearing box toward the hub and made to fit close up to the spokes, so as to allow sufficient room between the fork-arms and the cranks to permit the inner end of the pedal-pin J and lock-nut J' to clear the fork-arms. The fork-arms as usually constructed are made straight their entire length and the cranks are set out from the hub a sufficient distance to allow the inner end of the pedal-pin and nut to clear the fork-arms. Curving or bending the fork-arms inwardly, as described, enables a much closer build between the cranks and fork-arms than can possibly be obtained when the fork-arms are made straight their entire length. The solid portion G of the arms may be made shorter, if desired, and the hollow portion $G^4$ of the arms may be curved or bent to clear the crank-pin; but I prefer to extend the solid portion of the arms above the curve, as shown.

K represents the spokes of the wheel. L is the rim, and M the rubber tire.

The spokes are of the class known as "laced"

or "tangent" spokes, in which two spokes are made of one piece of wire, which is bent near its middle and inserted through an opening in the hub-flange and fastened at its ends to the rim of the wheel. The spokes K consist of a strip of sheet metal cut to the desired width and the necessary length to form two spokes. The ends of the strip of metal are wider than the body of the strip, as shown in Fig. 3, so that the same may be folded and a screw-thread cut thereon, as shown in Figs. 4 and 5. The spokes K may be formed of sheet metal, which is made thicker near its ends, or of wire flattened a portion of its length, the ends being of the desired thickness, upon which the screw-thread may be formed. The ends of the spokes K are secured to the rim of the wheel by means of a threaded nipple, N, and lock-nut O. The nipple N is provided with an internal screw-thread, $n$, which engages over the thread $k$, formed on the end of the spoke, and the outer surface of the nipple N is tapered and provided with an external screw-thread, $n'$, which is adapted to engage with the lock-nut O, the threaded bore of which is preferably tapered to correspond with the outer tapered surface of the nipple. The nipple N is provided with a longitudinal slot, $n^2$, extending through one of its sides, whereby the nipple will be tightly clamped around the end of the spoke when the nut is screwed down over the nipple. The threaded end of the spoke is inserted through an opening in the under side of the rim L, and the nipple is inserted over the threaded end $k$ through an opening, $p$, in the rim, which is made sufficiently large to permit the insertion of the lock-nut and a suitable wrench for turning it. The nut O is screwed over the nipple just sufficient to prevent the latter from spreading, and when the spoke has been properly adjusted or tightened by turning the nipple, the latter is tightly clamped around the spoke by screwing down the nut O over the nipple until it is sufficiently tight. The nipple is in this manner firmly locked around the spoke and prevented from turning or becoming loose or stripping the threads.

When wire spokes are used, the large end of the nipple is preferably made to extend below the threads on the end of the spoke and grasp the spoke where it is not weakened by the thread. The small end of the nipple is flattened at its sides, or formed so as to receive a wrench, and a special key is required to hold the nipple from turning when the lock-nut O is being secured thereon.

The center of the strip of metal forming two spokes is secured to the hub by passing one end of the strip through an opening, $c'$, formed in the rim or flange of the hub, as shown in Figs. 1 and 2. The openings $c'$ are arranged below or under the inner edge of the outer portion of the hub-rim, so that they are out of sight when viewing the hub from one side and permit the hubs to be cast with the openings without cores.

The rim L is constructed of a strip of sheet or rolled metal, which is given the proper curve to receive the rubber tire M.

In order to strengthen the rim without materially increasing its weight I construct the blank or strip of metal of which the rim is formed of greater thickness at the edges $m\ m$, where it is most required to protect it against stones and other obstacles in the road, and also at the center $m'$, where the opening is formed for the insertion of the spokes. The rim L is thus made much stronger than if the metal were of uniform thickness throughout without materially increasing the weight of the rim.

By constructing the spokes of sheet metal or flattened wire the spokes are much thinner, which enables the hub to be set closer to the fork, and they are not so liable to break when they are inserted through the hub-flange, as the width of the metal at this point is increased by the ends of the strip forming the two spokes drawing in opposite directions toward the rim. They can also be more securely fastened whey they overlap each other, and being thinner than round wire they offer less resistance to the air. They also may be cut of varying widths to give increased strength at desired points.

I claim as my invention—

1. The combination, with the central solid portion, A, of the axle provided with tubular ends, of the end portions, A' A', secured in the tubular ends of the central portion, substantially as set forth.

2. The combination, with the central solid portion, A, of the axle provided with tubular ends $a\ a$, of the end portions, A' A', made solid with the crank, and removably attached to the central portion, A, substantially as set forth.

3. The combination, with the central solid portion, A, of the axle provided with tubular ends $a\ a$, of the hubs C and end portions, A', made solid with the cranks and secured to the central portion by screw threads $a'$ and $c$, and a key, $b$, substantially as set forth.

4. The combination, with the axle and cranks of a wheel, of a key, $b$, adapted to be inserted in a key-seat formed in the crank and axle from outside the crank, and be driven out from the inside of the wheel, substantially as set forth.

5. The combination, with the axle, hub, and crank of a wheel, of a key-seat extending from outside the crank to the inside of the hub, whereby a key may be inserted from one end of the key-seat and driven out from the opposite end, substantially as set forth.

6. The combination, in a ball-bearing for velocipedes, of an inclosing bearing-box surrounding the balls, and two cone-bearings provided, respectively, with right and left hand screw-threads and overlapping sleeves or collars having interlocking ribs and projections whereby both cone-bearings are compelled to turn together while being permitted to slide one upon the other, and an axle provided with right and left hand screw-threads upon which said cone-bearings are mounted, substantially as set forth.

7. The combination, with the fork G, provided with jaws G' G', having an inwardly projecting bead, $g$, of an annular screw, $G^2$, adjustably secured to the jaws G', and provided with an inwardly-projecting bead, $g^2$, and a bearing-box, H, having spherical outer edges and arranged in the jaws G' G' and resting upon the beads $g$ $g^2$, substantially as set forth.

8. The combination, with the fork-jaws G' G', annular screw-nut $G^2$, and inwardly-projecting beads $g$ $g^2$, of a bearing-box, H, provided with a central bead or rim, $h'$, and outer spherical edges, and secured between the jaws with its outer edges resting upon the beads $g$ $g^2$, substantially as set forth.

9. The combination, with the fork-jaws G' G', provided with lugs $g^3$, of a bearing-box, H, having spherical outer edges, and secured between the jaws G' by an annular screw-nut, $G^2$, and bolt I, substantially as set forth.

10. The combination, with the rim and hub of a wheel, of tangent spokes, each constructed of a strip of sheet metal or flattened wire turned with its edges in the direction in which the wheel moves, and having its bent portion passed through an opening in the hub at an angle to a radial line, and its ends secured to the rim of the wheel, substantially as set forth.

11. The combination, with the hub or rim of a wheel, of a sheet-metal spoke made wider at its end and adapted to be folded and provided with a screw-thread, K, substantially as set forth.

12. The combination, with the rim of a wheel, and a spoke, K, provided with a screw-thread, K, of a tapered split nipple provided with an internal and external screw-thread and a lock-nut adapted to engage over said nipple and compress the latter around the spoke, substantially as set forth.

Witness my hand the 2d day of October, 1884.

EMMIT G. LATTA.

Witnesses:
EDWARD WILHELM,
CARL F. GEYER.